US007327985B2

(12) United States Patent
Morfitt, III et al.

(10) Patent No.: US 7,327,985 B2

(45) Date of Patent: Feb. 5, 2008

(54) MAPPING OBJECTIVE VOICE QUALITY METRICS TO A MOS DOMAIN FOR FIELD MEASUREMENTS

(75) Inventors: John C. Morfitt, III, Oakton, VA (US); Irina C. Cotanis, Warrenton, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 671 days.

(21) Appl. No.: 10/761,680

(22) Filed: Jan. 20, 2004

(65) Prior Publication Data

US 2004/0186716 A1 Sep. 23, 2004

Related U.S. Application Data

(60) Provisional application No. 60/441,520, filed on Jan. 21, 2003.

(51) Int. Cl.
*H04B 17/00* (2006.01)
*G10L 11/00* (2006.01)

(52) U.S. Cl. .................... 455/67.11; 704/226; 704/270

(58) Field of Classification Search ........ 704/226–228, 704/236, 270; 709/224; 379/1.03, 1.04; 370/252; 455/67.11, 67.13
See application file for complete search history.

(56) References Cited

U.S. PATENT DOCUMENTS

2002/0193999 A1 12/2002 Keane et al. ............... 704/270
2003/0093513 A1 5/2003 Hicks et al. ............... 709/224
2003/0200303 A1 10/2003 Chong ........................ 709/224
2003/0219087 A1 11/2003 Boland ....................... 375/371
2004/0002852 A1 1/2004 Kim ........................... 704/205
2005/0159944 A1* 7/2005 Beerends .................... 704/225

OTHER PUBLICATIONS

"How nonlinear regression works"; http://web.archive.org/web/20001021170849/http://www.graphpad.com/curvefit/how_nonlin_works.htm; Graphpad Software, Inc; Oct. 21, 2000.*

Beerends et al.; "Perceptual Evaluation of Speech Quality (PESQ), the new ITU standard for end-to-end speech quality assessment. Part II—Psychoacoustic model"; Oct. 1998.*

ITU-T Recommendation P.862.1; "Mapping function for transforming p.862 raw result scores to MOS-LQO"; International Telecommunication Union; Nov. 2003.*

International Telecommunication Union, IT-T P.862 "Perceptual Evaluation of Speech Quality (PESQ): An Objective Method for End-to-End Speech Quality Assessment of Narrow-Band Telephone Networks and Speech Codecs" 24 pages, Feb. 2001.

(Continued)

*Primary Examiner*—Patrick N. Edouard
*Assistant Examiner*—Joel Stoffregen

(57) ABSTRACT

A processing unit and method are described herein that are capable of estimating a quality of a speech signal transmitted through a wireless network. The processing unit uses a logistic function to map a score output from an objective voice quality method (PESQ algorithm) into a mean of opinion (MOS) score which is an estimation of the quality of the speech signal that was transmitted through the wireless network. The logistic function has the form: y=1+4/(1+exp(−1.7244*x+5.0187)) where x is the score from the PESQ algoritm which is in the range of −0.5 to 4.5 and y is the mapped MOS score which is in the range of 1 to 5 wherein if y=5 then the quality of the speech signal is considered excellent and if y=1 then the quality of the speech signal is considered bad.

21 Claims, 4 Drawing Sheets

OTHER PUBLICATIONS

Stephen D. Voran "Objective Estimation of Perceived Speech Quality Using Measuring Normalizing Blocks" NTIA Report 98-347, 10 pages, Apr. 1998.

Christopher Redding et al. "Voice Quality Assessment of Vocoders in Tandem Configuration" NTIA Report 01-386, 21 pages, Apr. 2001.

Timothy A. Hall "Objective Speech Quality Measures for Internet Telephony" in Voice over IP (VoIP) Technology, Petros Mouchtaris, Editor, Proceedings of SPIE vol. 4522, 9 pages, 2001.

Stephen D. Voran "Objective Estimation of Perceived Speech Quality, Part I: Development of the Measuring Normalizing Block Technique" IEEE Transaction on Speech and Audio Processing, Jul. 1999.

Antony Rix et al. "Comparison of Speech Quality Assessment Algorithms: BT PAMS, PSQM, PSQM+ and MNB" ITU-T Delayed Contribution D.80, Dec. 1998.

Antony Rix et al. "Performance Metrics for Objective Quality Assessment Systems in Telephony" ITU-T Delayed Contribution D.79, Dec. 1998.

Antony Rix "A New PESQ-LQ Scale to Assist Comparison Between P.862 PESQ Score and Subjective MOS" ITU-T Delayed Contribution D.86, 2001.

D.J. Atkinson "Additional Detail on MNB Algorithm Performance" ITU-T Delayed Contribution D.029, Apr. 1997.

Antony Rix et al. "Performance of the Integrated KPN/BT Objective Speech Quality Assessment Model" ITU-T Delayed Contribution D.136, May 2000.

J. Holub et al. "Low Bit-Rate Networks-A Challenge for Intrusive Speech Transmission Quality Measurements" (no date—possible prior art).

Antony Rix "Comparison Between Subjective Listening Quality and P.862 PESQ Score" (no date—possible prior art).

I. Cotanis "Impacting Factors on the Objective Measurement Algorithms for Speech Quality Assessment on Mobile Networks" IEEE International Conference on Telecommunications, Bucharest, Romania Jun. 2001.

Murray R. Spiegel "Schaum's Outline of Theory and Problems of Statistics Second Edition" pp. 196, 208-209, 233-234, 299 and 490, dated 1998.

J. Freund et al. "Dictionary/Outline of Basic Statistics" Dover Publications, Inc., p. 109, dated 1966.

J. Mandel "The Statistical Analysis of Experimental Data" pp. 393-394, dated 1964.

* cited by examiner

MAPPING OBJECTIVE VOICE QUALITY METRICS TO A MOS DOMAIN FOR FIELD MEASUREMENTS

CLAIMING BENEFIT OF PRIOR FILED PROVISIONAL APPLICATION

This application claims the benefit of U.S. Provisional Application Ser. No. 60/441,520 filed on Jan. 21, 2003 and entitled "Mapping Objective Voice Quality Metrics to the MOS Domain for Field Measurements" which is incorporated by reference herein.

BACKGROUND OF THE INVENTION

1. Field of the Invention

The present invention relates in general to the wireless telecommunications field and, in particular, to a processing unit and method for using a logistic function to map a score output from an objective voice quality method (e.g., Perceptual Evaluation of Speech Quality (PESQ) method) so that the mapped score corresponds to a mean opinion score (MOS) that is an estimation of the subjective quality of a speech signal transmitted through a wireless network.

2. Description of Related Art

Manufacturers and operators of wireless networks are constantly trying to develop new ways to estimate the voice quality (e.g., to estimate the mean opinion score (MOS)) of speech signals transmitted through a wireless network. Today the manufacturers and operators use an objective metric defined in the International Telecommunication Union, recommendation ITU-T P.862, to estimate the subjective quality of a speech signal transmitted through a wireless network. The ITU-T P.862 recommendation is entitled "Perceptual Evaluation of Speech Quality (PESQ), an Objective Method for End-to-End Speech Quality Assessment of Narrowband Telephone Networks and Speech Codecs". The contents of ITU-T P.862 are incorporated by reference herein. Although the score from the PESQ has a high correlation with the subjective MOS it is not on exactly the same scale as the subjective MOS which is measured in a subjective test by listeners performed in accordance with ITU-T recommendations P.800 and P.830. The PESQ score is between −0.5 and 4.5 while the subjective MOS score is between 1.0 and 5.0. As such, a PESQ score of below 2.0 corresponds to "bad" quality while "bad" quality for MOS is usually below 1.5. This difference in scales is problematical in that the score from the PESQ algorithm is not suitable for field measurement tools. Accordingly, there have been several attempts to address this problem by developing mapping functions to map a PESQ score to the MOS domain like the Auryst mapping functions described below and like the mapping functions described in the following articles the contents of which are incorporated by reference herein:

NTIA, ITU-T Study Group 12, delayed contribution D-029, April 1997, "Additional Detail on MNB Algorithm Performance". This contribution was subsequently published in IEEE Transactions on Speech and Audio Processing, Vol. 7, No. 4, July 1999.

Irina Cotanis "Impacting Factors on the Objective Measurement Algorithms for Speech Quality Assessment on Mobile Networks", IEEE International Conference on Telecommunications, Bucharest Romania June 2001.

Psytechnics Ltd., ITU-T Study Group 12, Study Period 2001, delayed contribution D.86, "A New PESQ-LQ Scale to Assist Comparison Between P.862 PESQ score and Subjective MOS".

Timothy A. Hall "Objective Speech Quality Measures for Internet Telephony", in Voice over IP (VoIP) Technology, Petros Mouchtaris, Editor, Proceedings of SPIE Vol. 4522 (2001).

Christopher Redding et al. "Voice Quality Assessment of Vocoders in Tandem Configuration" NTIA Report 01-386 April 2001.

Stephen D. Voran "Objective Estimation of Perceived Speech Quality Using Measuring Normalizing Blocks" NTIA Report 98-347 April 1998.

Stephen D. Voran "Objective Estimation of Perceived Speech Quality, Part I: Development of the Measuring Normalizing Block Technique", IEEE Transactions on Speech and Audio Processing, Vol. 7, No. 4, July 1999.

British Telecom, ITU-T Study Group 12, delayed contribution D.79 "Performance Metrics for Objective Quality Assessment Systems in Telephony" dated December 1998.

British Telecom, ITU-T Study Group 12, delayed contribution D.80 (December 1998) "Comparison of Speech Quality Assessment Algorithms: BT PAMS, PSQM, PSQM+ AND MNB" dated December 1998.

A first release of Auryst's mapping function originally developed by LCC International and subsequently purchased by Ericsson, used a mapping from the raw output values to dBQ and thence from dBQ to MOS. And, the second release of Auryst's mapping function used a logistic function that had parameters a, b, c and d optimized as:

$$y = a + \frac{b-1}{1+e^{c \cdot x + d}}$$

Many of these mapping functions do not work well for one reason or another. For example, the mapping functions described in the four articles by Timothy A. Hall, Christopher Redding and Stephen D. Voran where the output is mapped to the 0 to 1 range. Even though some of these mapping functions work well, such as the second release of Auryst's mapping function, there is still a need for improvement especially for wireless applications. This need is satisfied by the mapping (logistic) function of the present invention.

BRIEF DESCRIPTION OF THE INVENTION

The present invention includes a processing unit and method that are capable of estimating the quality of a speech signal transmitted through a wireless network. The processing unit uses a logistic function to map a score output from an objective voice quality method (PESQ algorithm) into a mean of opinion (MOS) score which is an estimation of the subjective quality of the speech signal that was transmitted through the wireless network. The logistic function has the form: y=1+4/(1+exp(−1.7244*x+5.0187)) where x is the score from the PESQ algoritm which is in the range of −0.5 to 4.5 and y is the mapped MOS score which is in the range of 1 to 5 wherein if y=5 then the quality of the speech signal is considered excellent and if y=1 then the quality of the speech signal is considered bad.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
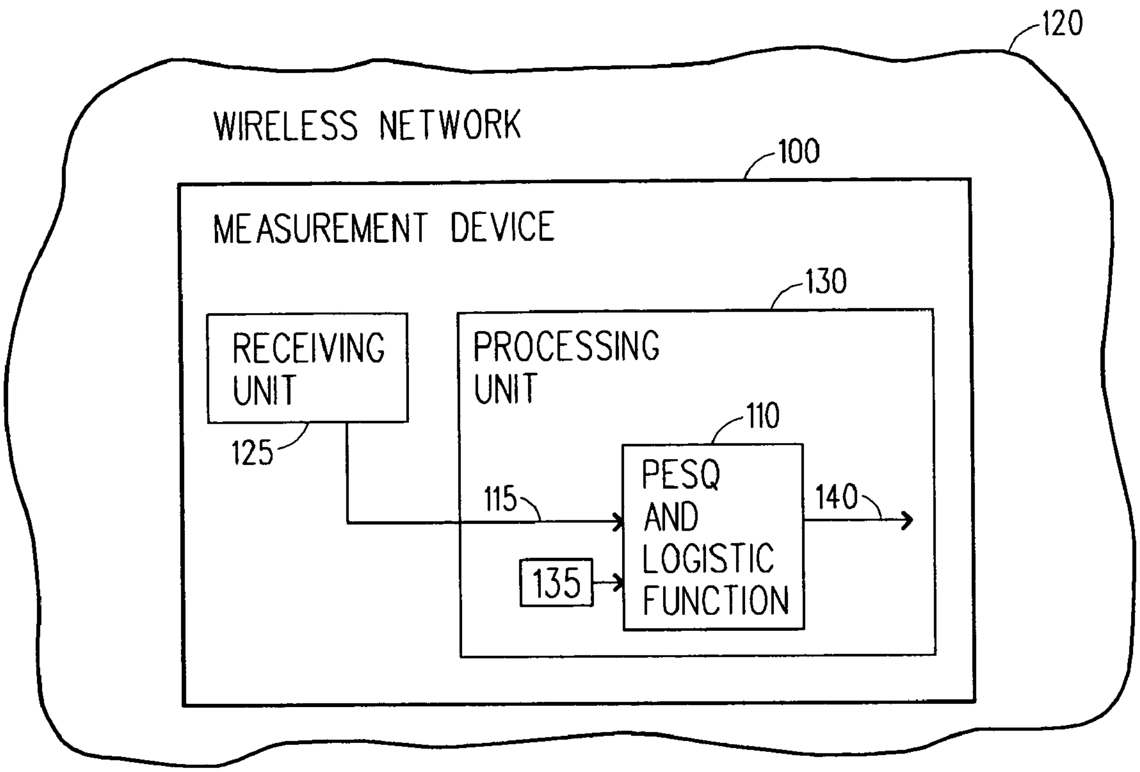
FIG. 1 is a block diagram of a measurement device that incorporates the PESQ algorithm and logistic function of the present invention which are used to estimate the voice quality of a speech signal transmitted in a wireless network.
Figure 2:
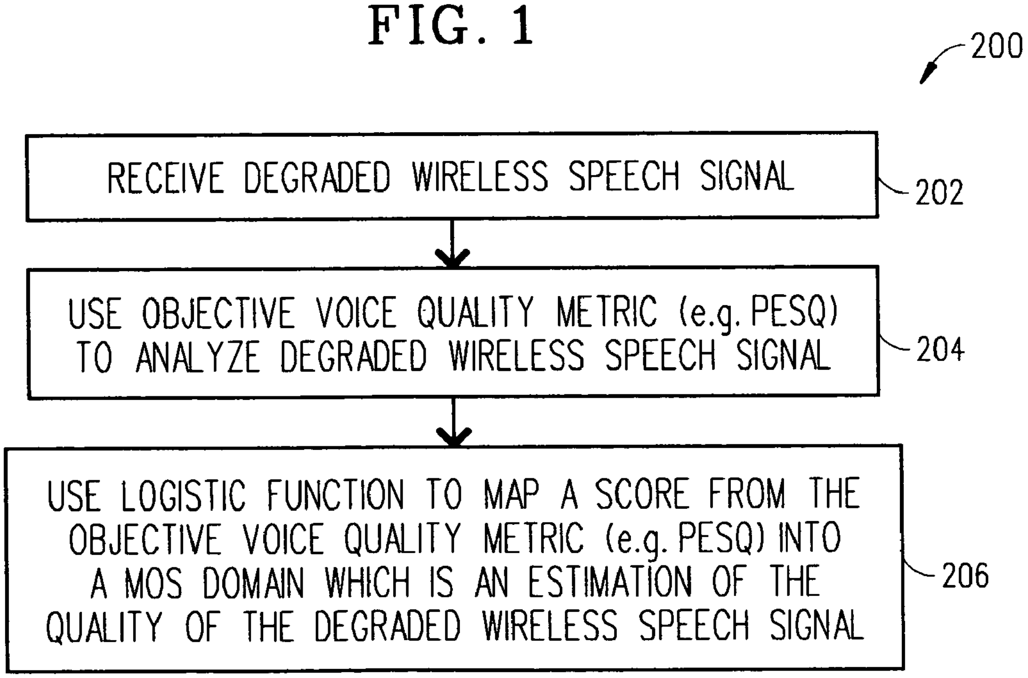
FIG. 2 is a flowchart illustrating the steps of a preferred method for estimating the voice quality of a speech signal transmitted in wireless networks in accordance with the present invention.

Referring to FIGS. 1 and 2, there are shown preferred embodiments of a measurement device 100 that incorporates the PESQ algorithm and logistic function 110 of the present invention and a method 200 for implementing the PESQ algorithm and logistic function 110 of the present invention which is used to estimate the quality of a speech signal 115 transmitted in a wireless network 120. It should be appreciated that certain details associated with the components within the measurement device 100 and the wireless network 120 are well known in the industry. Therefore, for clarity, the description provided below in relation to the measurement device 100 and the wireless network 120 omits those well known details and components that are not necessary to understand the present invention.

The measurement device 100 includes a receiving unit 125 (e.g., mobile phone 125, wireless voice transceiving device 125) that receives (step 202) a degraded speech signal 115 which was transmitted in the wireless network 120. The measurement device 100 also includes a processing unit 130 (e.g., digital signal processor (DSP) 130, general purpose processor 130) that uses (step 204) the PESQ algorithm (or any other objective voice quality method) to compare the degraded speech signal 115 with a stored reference speech signal 135 and output a PESQ score and then the processing unit 130 uses (step 206) the logistic (calibration) function 110 to map the PESQ score into an estimated MOS 140. The estimated MOS 140 is an indication of the subjective quality of the degraded speech signal 115 which in turn is an indication of the average voice quality of the wireless network 120.

In particular, the PESQ algorithm outputs a score in the range of −0.5 to 4.5 which is converted into the estimated MOS 140 which is in the range of 1.0 to 5.0 by the logistic function 110 that has the form:

$$y=1+4/(1+\exp(-1.7244*x+5.0187))$$

where x=the raw score from PESQ;

y=the estimated MOS 140.

It should be appreciated that the estimated MOS 140 which is in the range of 1.0 to 5.0 has a perceptual scale that can be easily understood by a user of the measurement device 100. The perceptual scale has been standardized as follows:

y=5.0 then the quality of the degraded speech signal 115 is excellent.

y=4.0 then the quality of the degraded speech signal 115 is good.

y=3.0 then the quality of the degraded speech signal 115 is fair.

y=2.0 then the quality of the degraded speech signal 115 is poor.

y=1.0 then the quality of the degraded speech signal 115 is bad.

It should be appreciated that the y values are not constrained to integers such as 1.0, 2.0 or 5.0 but values such as 1.9, 3.6 or 4.4 are also valid estimates of the MOS.

A detailed discussion about how the coefficients of the logistic function 110 were chosen and how the logistic function 110 was evaluated are described in detail below after a brief description about some of the possible commercial products that can utilize the present invention.

Figure 3A:
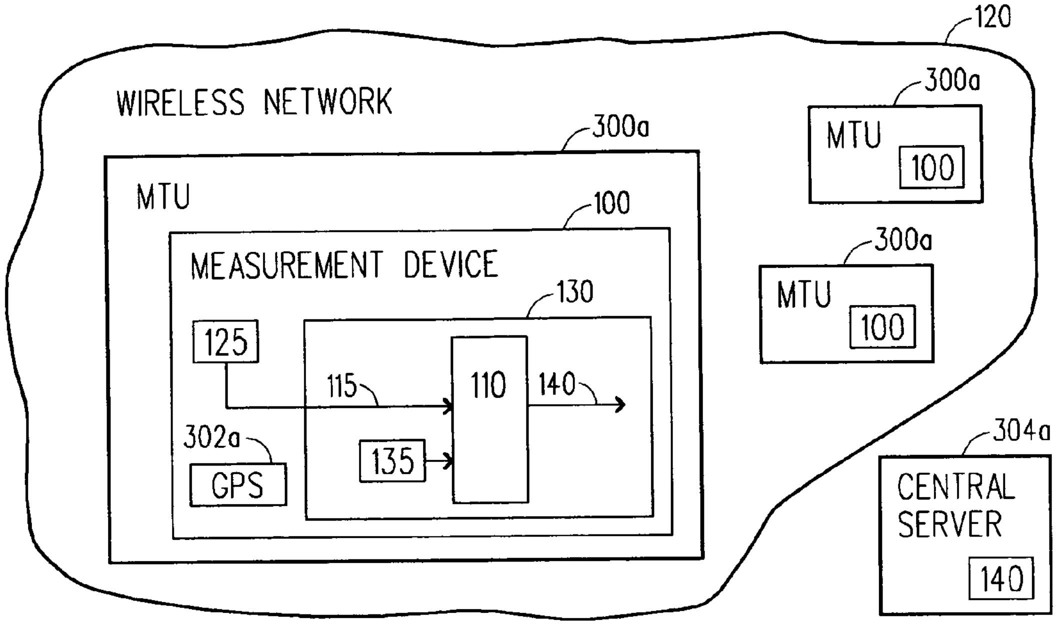
FIGS. 3A-3C are block diagrams of exemplary products that can be made which use one or more PESQ algorithms and logistic functions of the present invention to estimate the voice quality of one or more wireless networks.
Figure 3B:
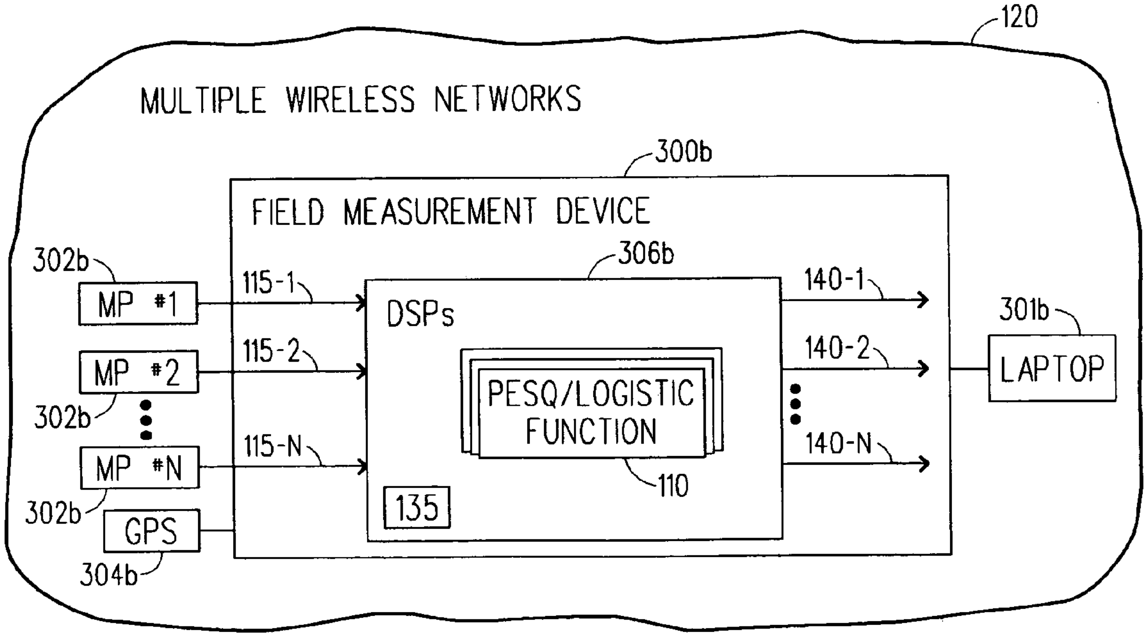
Figure 3C:
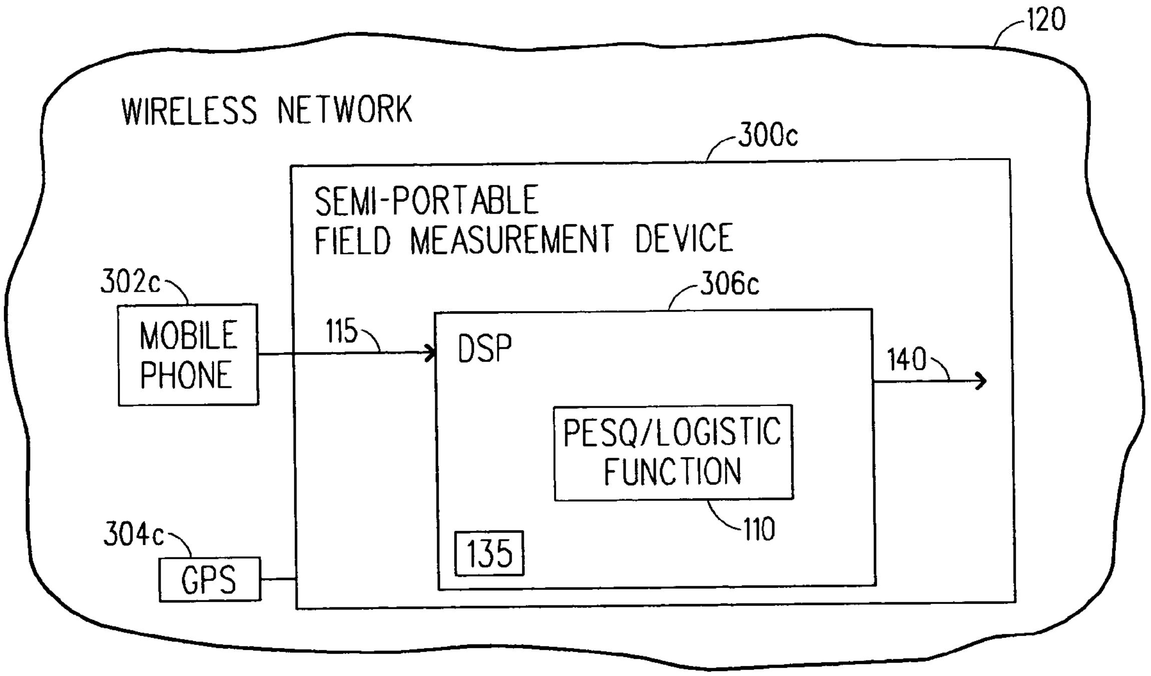

Referring to FIGS. 3A-3C, there are shown block diagrams of three commercial products that can use one or more of the PESQ algorithms (or any voice quality assessment algorithm) and logistic functions 110 to determine the voice quality of one or more wireless networks 120. It should be appreciated that the commercial products described below are just some of the products that can utilize the PESQ algorithm and logistic function 110 of the present invention to determine the voice quality of one or more wireless networks 120.

As shown in FIG. 3A, one or more mobile test units (MTUS) **300*a* (three shown) are located in an area serviced by a wireless network 120. Each MTU 300*a* incorporates a measurement device 100 which includes the receiving unit 125 and the processing unit 130 shown in FIG. 1. In addition, each MTU 300*a* incorporates a global position system (GPS) unit 302*a* which is used to determine the location of the respective MTU 300*a* at any given time within the wireless network 120. In operation, each MTU 300*a* would use the receiving unit 125 (e.g., mobile phone 125) to receive a degraded speech signal 115 transmitted in the wireless network 120. And, each MTU 300*a* would use the processing unit 130 that incorporates the PESQ algorithm (or any other objective voice quality method) and the logistic function 110 to compare the degraded speech signal 115 with a reference speech signal 135 and output an estimated MOS 140. Again, the estimated MOS 140 is an indication of the subjective quality of the degraded speech signal 115 which in turn is an indication of the voice quality of the wireless network 120. Lastly, each MTU 300*a* sends the estimated MOS 140 and information about its location within the wireless network 120 to a central server 304*a*. The central server 304*a* then analyzes this information and prepares reports about the voice quality in different areas of the wireless network 120**.

As shown in FIG. 3B, a field measurement device **300*b* is located in an area serviced by one or more wireless networks 120. The field measurement device 300*b* can be coupled to one or more mobile phones 302*b* (three shown). Each mobile phone 302*b* (e.g., GSM mobile phone 302*b*, TDMA mobile phone 302*b*) is configured to be used in a particular wireless network 120 (e.g., GSM wireless network 120, TDMA wireless network 120). The field measurement device 300***b* is also coupled to a laptop 301*b* and a GPS unit 304*b*. The field measurement device 300*b* also includes one or more DSPs 306*b* that implement multiple PESQ algorithms (or any other objective voice quality methods) and logistic functions 110. In particular, the DSPs 306*b* use the PESQ algorithms and logistic functions 110 to compare multiple degraded speech signals 115-1, 115-2 . . . 115-N that are received at the same time by different mobile phones 302*b* with a reference speech signal 135 and output multiple estimated MOSs 140-1, 140-2 . . . 140-N. Again, the estimated MOSs 140-1, 140-2 . . . 140-N are indications of the subjective qualities of the different degraded speech signals 115-1, 115-2 . . . 115-N which in turn are indications of the voice qualities of different wireless networks 120. This information can be displayed by the laptop 301*b* and used by an operator to determine how the voice quality of their wireless network 120 compares to the voice qualities of other wireless networks 120 under the same circumstances. The laptop 301*b* can also be used to control the field measurement device 300*b*, display real-time views of the current performance of the wireless network(s) 120, and store data (estimated MOS scores 140) to non-volatile memory (hard disk).

As shown in FIG. 3C, a semi-portable field measurement device 300*c* (e.g., laptop 300*c*) is located in an area service by a wireless network 120. The semi-portable field measurement device 300*c* can be coupled to a mobile phone 302*c* and a GPS unit 304*c*. The field measurement device 300*c* may also includes a DSP 306*b* that implements the PESQ algorithm (or any other objective voice quality method) and logistic function 110 (as shown). Or, the PESQ algorithm (or any other objective voice quality method) and logistic function 110 may be executed by a processor in the laptop 300*c* (not shown). In particular, the DSP 306*c* or laptop 300*c* uses the PESQ algorithm and logistic function 110 to compare a degraded speech signal 115 received by the mobile phone 302*c* with a reference speech signal 135 and output an estimated MOS 140. Again, the estimated MOS 140 is an indication of the subjective quality of the degraded speech signal 115 which in turn is an indication of the voice quality of the wireless network 120. The estimated MOS 140 along with the information about the particular location of the semi-portable field measurement device 300*c* can be analyzed and studied to learn about the voice quality in different areas of the wireless network 120.

Description about the Logistic Function 110

The description provided below describes in detail the logistic (mapping) function 110 and how the logistic function 110 was generated, calibrated and evaluated.

A. Description of the Test Database and Test Conditions

The test database comprises field-collected speech samples from fourteen separate wireless network providers in both the USA and Europe (see Table 1). This information includes the reference speech signals 135 (see FIGS. 1-3).

TABLE 1

| Technology | Vocoder | Frequency band |
|---|---|---|
| CDMA | 13 kb/sec QCELP | 850 Mhz, 1900 Mhz |
| | 8 kb/sec EVRC | 850 Mhz, 1900 Mhz |
| TDMA | 8 kb/sec ACELP | 850 Mhz, 1900 Mhz |
| GSM | 13 kb/sec RLP-LTP | 900 Mhz, 1800 Mhz, 1900 Mhz, |
| | 13 kb/sec EFR | 900 Mhz, 1800 Mhz, 1900 Mhz |

TABLE 1-continued

| Technology | Vocoder | Frequency band |
|---|---|---|
| iDEN | 8 kb/sec VSELP 3:1 | 850 Mhz |
| AMPS | — | 850 Mhz |

The reference speech material was represented by 4 unique sentence-pairs spoken by two males and two females. The speech samples were obtained in drive tests by transmitting the original speech files through one communication link (up or down) being tested in the wireless networks 120.

Since the test data base was used in a calibration process, it was required to generate speech samples that comprise meaningful and consistent characterization of the impairments caused by wireless networks 120. The scope was to determine a mapping function 110 that exhibited very close accuracies regardless of the data base.

The drive test routes were carefully designed to evenly cover a broad range of communication quality. The quality was considered from the subjective perspective. Six subjective bins of 0.5 MOS length were defined. A seventh bin was added to represent the highest quality and contained speech samples degraded only by the vocoders used in each of the test wireless networks 120. Sixteen samples (4 samples per speaker) were collected for each bin. A preliminary expert listening test discarded the speech samples containing artifacts that could not have been caused by the operation of the test wireless networks 120. Also, speech samples having defects that could affect the PESQ algorithm's performance, such as more than 40% muting in a speech file, were eliminated. The result of the preliminary test generated a speech data base covering all the subjective MOS bins. Each speaker was represented by at least 2 samples per bin.

This procedure was applied for both links on all tested wireless networks 120. However, due to the nature of the test conditions, some of the wireless networks 120 and/or links didn't cover the upper end MOS bin and/or the lower end MOS bin. Therefore, for these networks/links, less than 7 bins were used.

The whole test data base contained a number of 1052 speech samples collected from live wireless networks 120.

B. Mapping Procedure

This speech material was then subjectively scored in four listening tests performed by AT&T Labs. Each speech sample was graded by 44 voters divided in 4 groups. The MOS scores for each speech file represented a sample distribution of the population of the subjective opinion on the speech quality of that file. Therefore, each individual MOS score represented the estimated mean of the sample distribution of size N=44. The average standard deviation of the individual MOS scores had an estimated value of 0.723 MOS. Also, with a 95% confidence level, each individual MOS score exhibited an average error of +/−0.109 MOS.

It is expected that any other subjective opinion sample distribution characterized by similar properties (e.g. dimension, tested application, live network conditions) would display values within the 95% confidence interval.

However, in order to reduce the variance caused by different listening tests the same subjective lab performed all of the tests and the MNRU sequence and a set of clean vocoder conditions were used for a normalization procedure.

The PESQ algorithm was used to grade the same speech material. The sets of objective and subjective scores for the whole test database were used to determine the optimum coefficients for the mapping function 110. The coefficients were determined to minimize the error for the live wireless impairment domain. The optimization procedure used the Gauss-Newton method for rmse nonlinear fitting.

$$y=1+4/(1+\exp(-1.7244*x+5.0187)) \quad (1)$$

Figure 4:
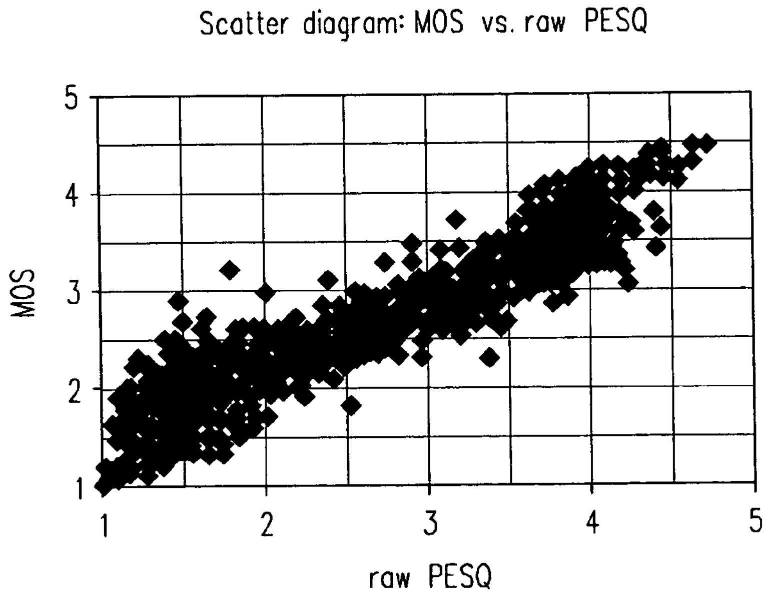
FIG. 4 is a graph of a scatter diagram used to generate the logistic function of the present invention that illustrates subjective MOS values vs. PESQ raw scores.

The curve fitting procedure used to map from the objective to the subjective domain took two steps. The first step was to collect data that showed corresponding values of the variables under consideration (raw PESQ and subjective MOS scores for the case under study). The second step is to build a scatter diagram (see FIG. 4). The shape of the scatter diagram provided information that assisted in the selection of a mapping function which turned out to be a logistic function 110.

Figure 5:
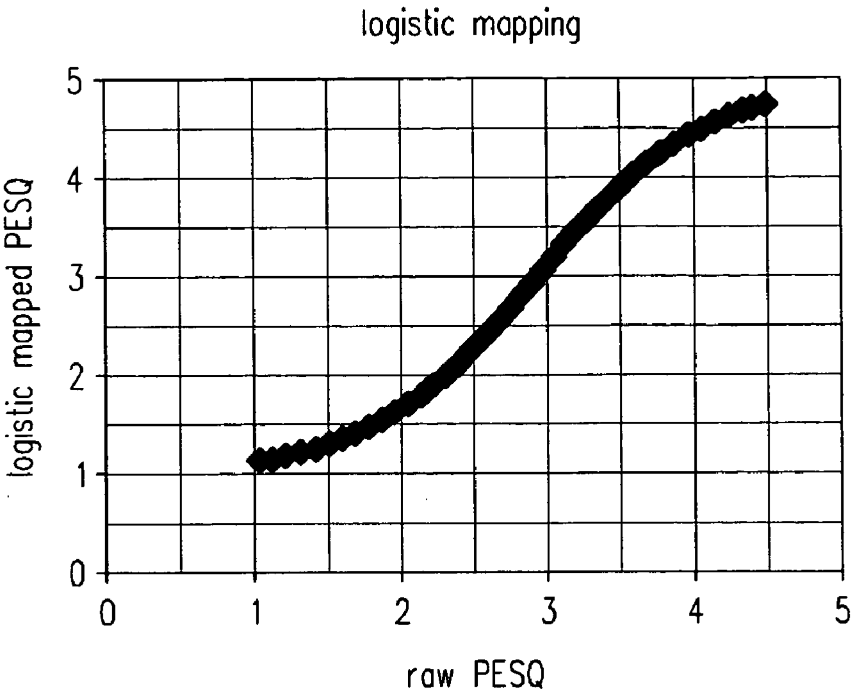
FIG. 5 is a graph related to the mapping of the logistic function of the present invention that illustrates logistic mapped MOS values vs. PESQ raw scores.

The logistic function 110 is within the range 1 to 5 and behaved similarly to the scatter diagram (see equation #1 and FIG. 5). Therefore, the logistic function 110 provided a good fit and is expected to maintain and even improve the performance statistics of PESQ algorithm. At a minimum, the error between the mapped PESQ and the MOS was compared to the error between the raw PESQ and the MOS and did not increase due to the introduction of the mapping by the logistic function 110.

In addition, the selection of the logistic function 110 was supported in the particular case of the PESQ algorithm for another reason. The PESQ algorithm already contains an internal polynomial mapping function in order to provide scores between −0.5 MOS and 4.5 MOS. The usage of a different type of function for the final mapping increased the capability of the PESQ algorithm to provide better accuracy.

It should be appreciated that the values represented in FIG. 5 correspond to a set of speech samples characterized by a certain range of speech quality that have been scored by the raw PESQ between 1.15 to 4.5 and respectively between 1.01 to 4.6 by the subjective opinion MOS. The obtained mapped PESQ ranges where therefore between 1.17 and 4.5 for this set of speech samples. As can be seen, the mapping function 110 ensures the following correspondence: (1) raw PESQ=−0.5 and mapped PESQ=1.01; and (2) raw PESQ=4.5 and mapped PESQ=4.76.

The logistic (calibration) function 110 was then tested by comparing the average MOS-scale score to the correspondingly mapped PESQ value for each speech sample. Three statistics, the Pearson correlation coefficient R, the residual error distribution and the prediction error Ep were used for the evaluation test. Since the evaluation concerned the wireless networks 120 that represented strong time-variant systems, the analysis was carried out per speech samples, and not per conditions. The results are presented in detail below.

C. Statistics Used in the Analysis

Three statistics where used in the evaluation process. Besides the Pearson correlation coefficient and the residual error distribution used for P.862 evaluation, the prediction error (see equation 2) was added to the analysis.

$$E_P = \sqrt{\frac{\sum (MOS_i - PESQ_i)^2}{N-1}} \quad i = 1 \ldots N \quad (2)$$

where N denoted the number of samples considered in the analysis. And, MOSi and PESQi represented the subjective and objective scores, respectively, for sample i.

The $E_P$ statistic gives the average standard error of the objective estimator of the subjective opinion. This evaluative statistic emerged from the wireless market demand. The network providers, designers, operators and consultants are users of drive test tools who like to have not only an estimator for the perceived speech quality, but the average evaluation error as well. The Ep statistic was normally calculated for the specific service under test, that is, over the range of impairments, but per link direction, per frequency band, and per transmission technology.

The market performance requirements for the prediction error are very strict, especially when it comes to drive test tools used for comparing wireless networks. Besides knowing the network performance within a 95% confidence interval, the operators definitely want to know how their network is ranked in comparison with the others. This benchmarking is also used to assess which of the network's link directions performed better. An acceptably accurate ranking required an objective estimator with a prediction error that was as low as possible, 0.4 MOS or lower. The release of a new model of a wireless phone also requires a low $E_p$ and a fine rank discrimination capability in order to accurately evaluate its perceived impact on the wireless network 120. The concerns mentioned above determined the market's requirement for $E_P$ as an evaluation statistic.

D. Results of the Mapping

Users (network providers, designers, operators and consultants) are interested in a general performance evaluation, along with a detailed one that is broken down at the network and link level. Accordingly, the evaluation was performed upon each tested wireless network 120 and detailed per network and link.

The ITU performance requirements (e.g., ITU-T D.136) were introduced as benchmarks in the assessment procedure.

I. General Performance Evaluation

The correlation coefficient and the prediction error across all tested wireless networks 120 are presented below in Table 2. The 95% confidence intervals were also calculated. The lower limit of the 95% CI was determined for the correlation since it was desired not to fall below the ITU requirements. For the $E_P$ the upper limit of the 95% CI is presented since it is desired to evaluate how large the average error could be. Table 2 lists the average performance of the mapping function 110 for all networks.

TABLE 2

| | Correlation | Correlation 95% CI Lower Limit | $E_p$ | $E_p$ 95% CI Upper Limit |
|---|---|---|---|---|
| Logistic Function | 0.941 | 0.923 | 0.363 | 0.374 |
| Raw PESQ | 0.927 | 0.903 | 0.471 | 0.485 |
| ITU Req. | >0.85 | >0.85 | n/a | n/a |

It can be seen that the mapping ensured an increase of the correlation coefficient. As expected, the 95% CI lower limit did not fall below ITU requirements. The logistic mapping conveyed a noticeable $E_p$ decrease, and even exhibited a 95% CI upper limit below the lower limit of the raw $E_p$ value of 0.457.

To evaluate the significance of the differences between the correlation coefficients and between the prediction errors, statistical significance tests (hypothesis tests) with 95% significance level were applied.

i. Significance of the Difference Between the Correlation Coefficients

The comparison was performed between the raw and calibrated scores of PESQ algorithm.

The $H_0$ hypothesis assumed that there was no significant difference between correlation coefficients. The $H_1$ hypothesis considered that the difference was significant, although not specifying better or worse.

The Fisher statistic (see equation #3) was calculated for each correlation coefficient R. Then, the normally distributed statistic (see equation #4) was determined for each comparison and evaluated against the 95% Student-t value for the two-tail test, which is the tabulated value t(0.05) =1.96.

$$z = 1.1513 \cdot \log_{10}\left(\frac{1+R}{1-R}\right) \quad (3)$$

$$Z_N = \frac{z1 - z2 - \mu_{(z1-z2)}}{\sigma_{(z1-z2)}} \quad (4)$$

$$\text{where } \mu_{(z1-z2)}=0 \quad (5)$$

$$\text{and } \sigma_{(z1-z2)}=\sqrt{\sigma_{z1}^2+\sigma_{z2}^2} \quad (6)$$

$\sigma_{z1}$ and $\sigma_{z2}$ represent the standard deviation of the Fisher statistic for each of the compared correlation coefficients. The mean (see equation #5) was set to zero due to the $H_0$ hypothesis. The standard deviation of the Fisher statistic is given by equation #7:

$$\sigma_z=\sqrt{1/(N-3)} \quad (7)$$

where N represents the total number of speech samples. The results of the significance test are presented in Table 3. It can be seen that the difference between the logistic mapping R and the raw PESQ R is statistically significant with 95% confidence.

TABLE 3

| Statistics | | Raw vs. logistic mapping |
|---|---|---|
| R | $Z_N$ vs. t (0.05) | 2.521 > 1.96 |
| | Statistical decision | $H_0$ rejected, $H_1$ accepted: significant difference between correlation coefficients |
| $E_p$ | ζ vs. F(0.05, n1, n2) | 1.298 > 1 |
| | Statistical decision | $H_0$ rejected, $H_1$ accepted: logistic $E_p$ significantly lower than cubic polynomial |

ii. Significance of the Difference between the Prediction Errors

The $E_p$ statistic is more likely the main concern regarding the performance of the objective estimator of MOS. Therefore, it was important to analyze the statistical difference that existed between the $E_P$ values corresponding to the raw PESQ score and the calibrated MOS scores 140.

The comparison procedure was performed similarly to the one used for the correlation coefficients. The $H_0$ hypothesis considered that there was no difference between $E_P$ values. The alternative $H_1$ hypothesis was slightly different, assuming that the lower $E_P$ value was statistically significantly lower. The Fisher statistic for the Ep is given by equation #8:

$$\zeta=E_P(\max)/E_P(\min) \quad (8)$$

where $E_P$ (max) is the highest $E_P$ and $E_P$ (min) is the lowest $E_P$ involved in the comparison. The z statistic was evaluated against the tabulated value F(0.05, n1, n2) that ensured a 95% significance level. For the Fisher statistic, variables n1 and n2 denote the number of degrees of freedom (N1-1 and N2-1, respectively) for the compared prediction errors. Due to the fact that in our case the number of samples is very large, F (0.05, n1, n2) equals unity.

Table 3 showed that in both cases the $H_0$ hypothesis was rejected. Thus, the logistic mapping provided a significant lower Ep than the raw PESQ.

iii. Residual Error Distribution

Table 4 presents the residual error distribution for both analyzed cases. The ITU performance requirements are included as a benchmark.

TABLE 4

| | MOS error bin | <0.25 | <0.5 | <0.75 | <1 | <1.25 | <1.5 |
|---|---|---|---|---|---|---|---|
| CDF % of the residual error | Raw PESQ | 62.3 | 83.48 | 97.25 | 99.62 | 100 | 100 |
| | Logistic mapping | 78.92 | 94.49 | 98.77 | 99.81 | 99.81 | 100 |
| | ITU requirements | — | 75 | — | 95 | — | 98 |

The logistic mapping function 110 ensured a residual error below 0.5 MOS in 94.49% of the cases, which represents a sensible higher percentage than the raw PESQ value of 83.48%. Also, the percentage for the exhibited residual error below 1 MOS was very high, but close to the raw PESQ.

Figure 6:
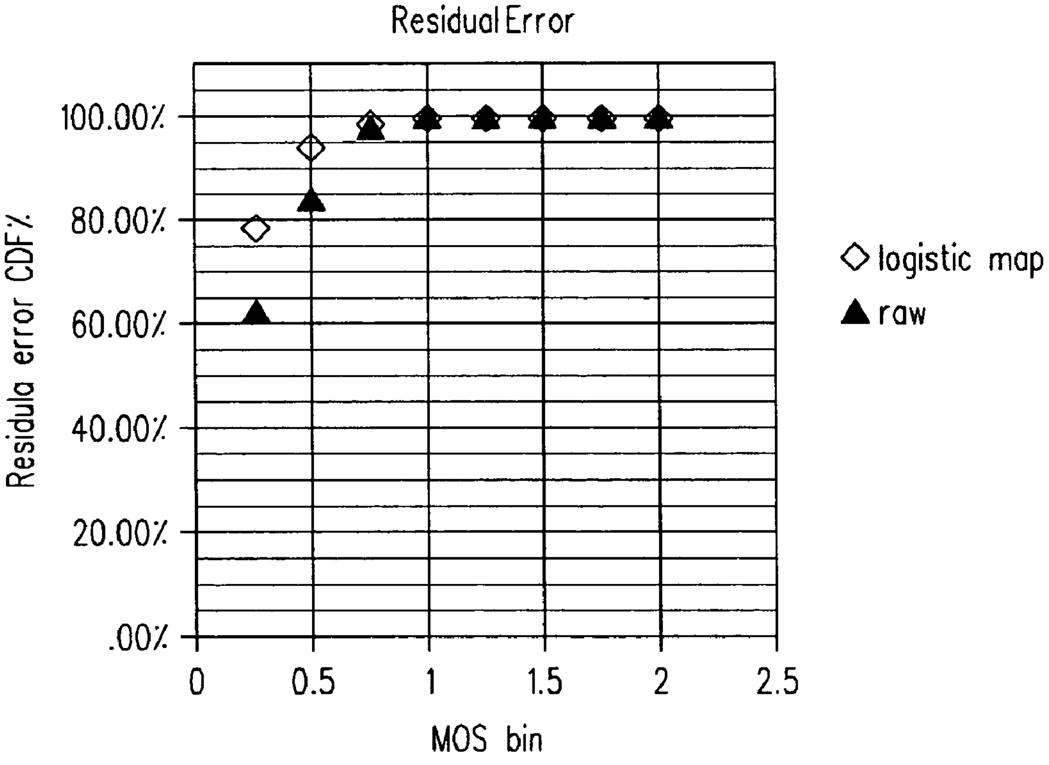
FIG. 6 is a graph related to the residual error distribution associated with the logistic function of the present invention that illustrates residual error CDF % vs. MOS bin.

The residual error distribution shows that the logistic mapping function 110 performs a significant improvement of the raw PESQ for the wireless application. This improvement is especially observable for the low MOS bins, which represent the bins of the highest concern of the evaluation (see FIG. 6).

II. Network and Link Level Performance Analysis

The same analysis that was performed for all networks and links were also performed at a detailed level. The correlation and the $E_P$ were determined per network and per link (see Table 5). The statistical significance was more difficult to evaluate for this type of analysis, since a smaller number of tested samples were available per network and per link. However, for some cases the analysis of statistical significance was allowed by the number of samples and the appropriate standard deviation values.

i. Correlation Coefficient (R)

There are some networks and/or links for which the mapping increased the original correlation coefficient and some for which the calibration had the opposite effect. However, a valid hypothesis test showed that the logistic mapping ensured in 29% of the presented cases (see Table 5) a statistically significant improvement in regard to the correlation of the original PESQ algorithm. The conditions for a statistical significance test were not met by the other cases.

The comparison with the ITU performance requirements showed that there were cases for which the original PESQ algorithm, along with the mapping function 110, had correlation coefficients that were lower than 85%. However, a valid hypothesis test showed that the difference is not statistically significant.

ii. Prediction Error

The calibrated PESQ scores provided a lower $E_p$ in regard to the original PESQ, but statistical significance was recorded only in 4.8% of the cases. The conditions for a statistical significance test were not met by the other cases.

iii. Residual Error Distribution

The detailed analysis showed that the logistic mapping and the original PESQ met the ITU requirements of the residual error distribution for all the networks and links.

TABLE 5

| | | Logistic mapping | | Raw | |
|---|---|---|---|---|---|
| Network | Link | correlation | $E_P$ | correlation | $E_P$ |
| 1 | dn | 0.957 | 0.333 | 0.954 | 0.518 |
| | up | 0.919 | 0.529 | 0.907 | 0.684 |
| | both | 0.927 | 0.442 | 0.92 | 0.607 |
| 2 | dn | 0.955 | 0.282 | 0.946 | 0.433 |
| | up | 0.916 | 0.433 | 0.913 | 0.581 |
| | both | 0.932 | 0.366 | 0.926 | 0.513 |
| 3 | dn | 0.934 | 0.323 | 0.926 | 0.423 |
| | up | 0.936 | 0.316 | 0.943 | 0.415 |
| | both | 0.936 | 0.319 | 0.936 | 0.419 |
| 4 | dn | 0.959 | 0.311 | 0.955 | 0.476 |
| | up | 0.931 | 0.249 | 0.927 | 0.374 |
| | both | 0.954 | 0.282 | 0.952 | 0.428 |
| 5 | dn | 0.908 | 0.296 | 0.911 | 0.366 |
| | up | 0.851 | 0.454 | 0.854 | 0.431 |
| | both | 0.878 | 0.383 | 0.879 | 0.399 |
| 6 | dn | 0.843 | 0.38 | 0.847 | 0.42 |
| | up | 0.93 | 0.323 | 0.935 | 0.361 |
| | both | 0.907 | 0.352 | 0.911 | 0.391 |
| 7 | dn | 0.907 | 0.39 | 0.912 | 0.415 |
| | up | 0.947 | 0.362 | 0.939 | 0.468 |
| | both | 0.926 | 0.376 | 0.926 | 0.443 |
| 8 | dn | 0.922 | 0.226 | 0.933 | 0.274 |
| | up | 0.91 | 0.347 | 0.91 | 0.398 |
| | both | 0.912 | 0.297 | 0.915 | 0.346 |
| 9 | dn | 0.933 | 0.428 | 0.932 | 0.597 |
| | up | 0.948 | 0.404 | 0.949 | 0.576 |
| | both | 0.936 | 0.418 | 0.936 | 0.588 |
| 10 | dn | 0.95 | 0.322 | 0.936 | 0.425 |
| | up | 0.927 | 0.383 | 0.919 | 0.451 |
| | both | 0.938 | 0.353 | 0.928 | 0.438 |
| 11 | dn | 0.987 | 0.324 | 0.968 | 0.482 |
| | up | 0.972 | 0.459 | 0.917 | 0.612 |
| | both | 0.978 | 0.395 | 0.936 | 0.779 |
| 12 | dn | 0.987 | 0.311 | 0.926 | 0.522 |
| | up | 0.977 | 0.454 | 0.823 | 0.515 |
| | both | 0.984 | 0.386 | 0.911 | 0.515 |
| 13 | dn | 0.979 | 0.339 | 0.964 | 0.441 |
| | up | 0.981 | 0.386 | 0.865 | 0.498 |
| | both | 0.984 | 0.361 | 0.943 | 0.468 |
| 14 | dn | 0.98 | 0.286 | 0.947 | 0.484 |
| | up | 0.982 | 0.416 | 0.932 | 0.422 |
| | both | 0.986 | 0.355 | 0.946 | 0.451 |
| ITU requirement | | 0.85 | n/a | 0.85 | n/a |

From the foregoing, it can be readily appreciated by those skilled in the art that the present invention provides a calibration function for P.862 which enables one to obtain an estimate of MOS which is an indication of the voice quality of one or more wireless networks. Essentially, the invention provides a better form for mapping between the MOS and the raw output from the PESQ (or any other objective voice quality metric). A description was also provided above that discussed the domain of conditions for which the mapping of the calibration function was determined to be valid, with the accompanying correlation coefficients, residual errors and prediction errors. In addition, a detailed statistical analysis was provided above that proved the calibration function brings statistically significant improvements to the raw PESQ.

Following are some additional features, advantages and uses of the logistic function 110 of the present invention:

- The logistic (calibration) function of the present invention allows the mapping of the lowest and highest scores to exceed the MOS values obtained from the actual calibration data. This is important since the calibration data may not represent the complete range of field conditions, even with a diligent attempt to capture the fullest possible range of quality. Other traditional mapping functions, such as the cubic polynomial, suffer from constraints inherent in the formula that prevent the mapping from exceeding the range of the original calibration data set.
- The logistic (calibration) function of the present invention provides a S-curve, a form that has an asymptotic lower end, a nearly linear mid-section, and an asymptotic upper end. This form is more suitable to fit the raw data than the traditional mapping function which used a cubic polynomial that only allowed a single curve, rather than a double curve.
- The logistic (calibration) function provides the lowest rms error for the calibration data when compared to traditional mapping functions.
- The logistic (calibration) function does not require that very low and very high values be truncated to fixed values as required by the traditional mapping functions that use the cubic polynomial. This is important in field measurements where the average voice quality of networks is being compared. If very low or very high values are truncated, then the average value is no longer accurate.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for estimating the subjective quality of a speech signal transmitted through a wireless network, said method comprising the step of:

analyzing the speech signal using an objective voice quality method; and mapping a score output from the objective voice quality method into a mean opinion score (MOS) domain using a logistic function that has the form:

$$y=1+4/(1+\exp(-1.7244*x+5.0187))$$

where x=the score from said objective voice quality method which is in the range of −0.5 to 4.5;

y=the mapped score that is in the MOS domain which is in the range of 1 to 5;

wherein y provides a mapped score of the analyzed speech signal, thereby providing an estimate of the subjective quality of the speech signal.

2. The method of claim 1, wherein said MOS domain has a scale wherein when:

y=5.0 then the quality of the speech signal is excellent;

y=4.0 then the quality of the speech signal is good:

y=3.0 then the quality of the speech signal is fair;

y=2.0 then the quality of the speech signal is poor; and y=1.0 then the quality of the speech signal is bad.

3. The method of claim 1, wherein said logistic function has coefficients that were determined by using a Gauss-Newton method.

4. The method of claim 1, wherein said objective voice quality method is a Perceptual Evaluation of Speech Quality (PESQ) method.

5. The method of claim 1 wherein said logistic function provides an S-curve with a shape that has an asymptotic lower end, a nearly linear mid-section and an asymptotic upper end.

6. The method of claim 1, wherein said mapped score is suitable for a field measurement tool.

7. A processing unit for estimating a quality of a speech signal transmitted through a wireless network by analyzing the speech signal using an objective voice quality method and mapping a score output from the objective voice quality method into a mean opinion score (MOS) domain using a logistic function that has the form:

$$y=1+4/(1+\exp(-1.7244*x+5.0187))$$

where x=the score from said objective voice quality method which is in the range of −0.5 to 4.5;

y=the mapped score that is in the MOS domain which is in the range of 1 to 5 wherein y provides a mapped score of the analyzed speech signal for the processing unit, the processing unit being adapted for use in a computer, thereby providing an estimate of the subjective quality of the speech signal.

8. The processing unit of claim 7, wherein said MOS domain has a scale wherein when:

y=5.0 then the quality of the speech signal is excellent;

y=4.0 then the quality of the speech signal is good;

y=3.0 then the quality of the speech signal is fair;

y=2.0 then the quality of the speech signal is poor; and y=1.0 then the quality of the speech signal is bad.

9. The processing unit of claim 7, wherein said logistic function has coefficients that were determined by using a Gauss-Newton method.

10. The processing unit of claim 7, wherein said objective voice quality method is a Perceptual Evaluation of Speech Quality (PESQ) method.

11. The processing unit of claim 7, wherein said logistic function provides an S-curve with a shape that has an asymptotic lower end, a nearly linear mid-section and an asymptotic upper end.

12. The processing unit of claim 7, wherein said processing unit is used in a measurement tool that determines the speech quality of the wireless network.

13. A method for estimating a voice quality of a wireless network comprising the steps of:

receiving a degraded speech signal that was transmitted through the wireless network;

using an objective voice quality method and a logistic function to compare the degraded speech signal with a reference speech signal and output an estimated mean opinion score (MOS) which is an indication of the subjective quality of the degraded speech signal which in turn is an indication of the voice quality of the wireless network;

wherein said objective voice quality method outputs a score in the range of −0.5 to 4.5 which is converted into the estimated MOS which is in the range of 1.0 to 5.0 by the logistic function that has the form:

$$y=1+4/(1+\exp(-1.7244*x+5.0187))$$

where x=the score from said objective voice quality method;

y=the estimated MOS;

wherein y provides a mapped score of the analyzed speech signal, thereby providing an estimate of the subjective quality of the speech signal.

14. The method of claim 13, wherein a wireless voice transceiving device is used to receive the degraded speech signal.

15. The method of claim 13, wherein a processor is used to implement the objective voice quality method and the logistic function so as to compare the degraded speech signal with the reference speech signal and output the estimated MOS.

16. The method of claim 13, wherein said estimated MOS has a scale wherein when:

y=5.0 then the quality of the degraded speech signal is excellent;

y=4.0 then the quality of the degraded speech signal is good;

y=3.0 then the quality of the degraded speech signal is fair;

y=2.0 then the quality of the degraded speech signal is poor; and y=1.0 then the quality of the degraded speech signal is bad.

17. The method of claim 13, wherein said objective voice quality method is a Perceptual Evaluation of Speech Quality (PESQ) method.

18. A measurement device for estimating a voice quality of a wireless network comprising:

a receiving unit for receiving a degraded speech signal that was transmitted through the wireless network;

a processing unit that uses an objective voice quality method and a logistic function to compare the degraded speech signal with a reference speech signal and output an estimated mean opinion score (MOS) which is an indication of the subjective quality of the degraded speech signal which in turn is an indication of the voice quality of the wireless network; and wherein said objective voice quality method outputs a score in the range of −0.5 to 4.5 which is converted into the estimated MOS which is in the range of 1.0 to 5.0 by the logistic function that has the form:

$$y=1+4/(1+\exp(-1.7244*x+5.0187))$$

where x=the score from said objective voice quality metric;

y=the estimated MOS;

wherein y provides a mapped score of the analyzed speech signal, thereby providing an estimate of the subjective quality of the speech signal.

19. The measurement device of claim 18, wherein said receiving unit is a wireless voice transceiving device and said processing unit is a processor.

20. The measurement device of claim 18, wherein said estimated MOS has a scale wherein when:

y=5.0 then the quality of the degraded speech signal is excellent;

y=4.0 then the quality of the degraded speech signal is good;

y=3.0 then the quality of the degraded speech signal is fair;

y=2.0 then the quality of the degraded speech signal is poor; and y=1.0 then the quality of the degraded speech signal is bad.

21. The measurement device of claim 18, wherein said objective voice quality method is a Perceptual Evaluation of Speech Quality (PESQ) method.

* * * * *